(12) United States Patent
Galante et al.

(10) Patent No.: US 8,630,420 B2
(45) Date of Patent: Jan. 14, 2014

(54) METHOD FOR AUTO-CONFIGURATION OF A NETWORK TERMINAL ADDRESS

(75) Inventors: Maria Pia Galante, Turin (IT); Luca Dell'Uomo, Turin (IT); Andrea Calvi, Turin (IT)

(73) Assignee: Telecom Italia S.p.A., Milan (IT)

( * ) Notice: Subject to any disclaimer, the term of this patent is extended or adjusted under 35 U.S.C. 154(b) by 1255 days.

(21) Appl. No.: 11/921,173

(22) PCT Filed: May 31, 2005
(Under 37 CFR 1.47)

(86) PCT No.: PCT/EP2005/005835
§ 371 (c)(1),
(2), (4) Date: Jun. 8, 2009

(87) PCT Pub. No.: WO2006/128481
PCT Pub. Date: Dec. 7, 2006

(65) Prior Publication Data
US 2010/0008507 A1    Jan. 14, 2010

(51) Int. Cl.
*H04L 9/08* (2006.01)
*H04K 1/00* (2006.01)

(52) U.S. Cl.
USPC ........... 380/278; 380/247; 380/259; 380/260; 380/262; 380/277; 713/161; 713/162; 713/163; 713/169; 713/171; 713/182; 713/193; 726/2; 726/3; 726/6; 726/26; 726/29; 726/30

(58) Field of Classification Search
USPC ........ 380/247, 259, 278; 713/162; 726/29–30
See application file for complete search history.

(56) References Cited

U.S. PATENT DOCUMENTS

| | | | | |
|---|---|---|---|---|
| 5,682,428 A * | 10/1997 | Johnson | | 705/71 |
| 5,729,537 A | 3/1998 | Billström | | |
| 6,298,428 B1 * | 10/2001 | Munroe et al. | | 711/202 |
| 6,574,658 B1 * | 6/2003 | Gabber et al. | | 709/206 |
| 6,591,291 B1 * | 7/2003 | Gabber et al. | | 709/206 |
| 7,233,782 B2 * | 6/2007 | Bao et al. | | 455/404.2 |
| 7,308,582 B2 * | 12/2007 | Takeda et al. | | 713/186 |
| 7,627,755 B2 * | 12/2009 | Ahonen et al. | | 713/163 |
| 7,861,288 B2 * | 12/2010 | Tsuruoka et al. | | 726/10 |
| 7,913,082 B2 * | 3/2011 | Kim | | 713/162 |
| 7,916,739 B2 * | 3/2011 | Trostle et al. | | 370/401 |

(Continued)

FOREIGN PATENT DOCUMENTS

EP    1 075 123 A1    2/2001

OTHER PUBLICATIONS

Mouly, M. et al., "Mobility and Security Management," GSM System for Mobile Communications, Lassay-Les-Chateaux, Europe Media, FR, pp. 432-498, XP000860007, (1993).

(Continued)

*Primary Examiner* — Edan Orgad
*Assistant Examiner* — Jenise Jackson
(74) *Attorney, Agent, or Firm* — Finnegan, Henderson, Farabow, Garrett & Dunner, L.L.P.

(57) ABSTRACT

A method for generating a network address in a communication network includes at least one user equipment and a network equipment. The method includes: a) providing a same shared secret key both at the at least one user equipment and at the network equipment; and b) generating at least a portion of the network address at the at least one user equipment and at the network equipment based upon at least the shared secret key.

21 Claims, 3 Drawing Sheets

(56) References Cited

U.S. PATENT DOCUMENTS

| | | | |
|---|---|---|---|
| 8,014,526 B2* | 9/2011 | Billhartz et al. | 380/268 |
| 2001/0017856 A1 | 8/2001 | Asokan et al. | |
| 2002/0099941 A1* | 7/2002 | Tanimoto | 713/168 |
| 2002/0152380 A1 | 10/2002 | O'Shea et al. | |
| 2003/0061605 A1* | 3/2003 | Genevois et al. | 725/6 |
| 2003/0081578 A1 | 5/2003 | White et al. | |
| 2004/0008845 A1* | 1/2004 | Le et al. | 380/277 |
| 2004/0088544 A1* | 5/2004 | Tariq et al. | 713/162 |
| 2004/0199789 A1* | 10/2004 | Shaw et al. | 713/201 |
| 2005/0185794 A1* | 8/2005 | Billhartz et al. | 380/37 |
| 2005/0198374 A1* | 9/2005 | Suzuki | 709/238 |
| 2006/0248230 A1* | 11/2006 | Kempf et al. | 709/245 |
| 2007/0055870 A1* | 3/2007 | Bruti et al. | 713/168 |

OTHER PUBLICATIONS

Narten, T. et al., "Privacy Extensions for Stateless Address Autoconfiguration in IPv6," Network Working Group, Request for Comments: 3041, Category: Standards Track, pp. 1-17, XP015008824, (Jan. 2001).

* cited by examiner

METHOD FOR AUTO-CONFIGURATION OF A NETWORK TERMINAL ADDRESS

CROSS REFERENCE TO RELATED APPLICATION

This application is a national phase application based on PCT/EP2005/005835, filed May 31, 2005, the content of which is incorporated herein by reference.

BACKGROUND OF THE INVENTION

1. Field of the Invention

The present invention relates to network terminal address auto-configuration in communication networks.

2. Description of the Related Art

As disclosed by U.S. Pat. No. 5,729,537, continued advancements in the field of cellular telephony, as well as other types of radio telecommunications, have permitted the introduction of new services and new forms of communication pursuant to already-installed cellular, and other radio telecommunication, networks.

For instance, proposals have been set forth to provide existing cellular, and other communication networks, with the capability of communicating packet data.

For example, GPRS (General Packet Radio Service) has been proposed for GSM (Global System for Mobile communication) cellular communication network to provide GSM mobile stations with the capability of communicating packet data via the GSM network and, in particular, with the capability of using the Internet.

As well known in the art and as disclosed, for example, by said U.S. Pat. No. 5,729,537 and by US 2001/0017856, a GSM mobile communication network typically comprises a circuit-switched core network and a plurality of access networks (base station systems, BSS) connected to the circuit-switched core network. The circuit-switched core network typically comprises a plurality of mobile switching centers (MSC), a plurality of visitor location registers (VLR), a home location register (HLR) and an authentication center (AUC). Each base station system typically comprises a plurality of base station controllers (BSC), each having associated a plurality of base transceiver stations. (BTS).

In a GPRS context, gateway GPRS support nodes (GGSN) and serving GPRS support nodes (SGSN) connect the GSM mobile communication network (typically, the base station systems thereof) to a packet data network to make possible packet data transmission between mobile terminals and packet data networks.

Authentication procedures are typically performed prior to providing a GSM mobile station with access to the GSM network. For example, in a typical GSM challenge authentication procedure, the mobile station transmits to the network the International Mobile Subscriber Identity (IMSI), which is stored in its Subscriber Identity Module (SIM) card with associated a corresponding authentication key Ki. For each subscriber, the Authentication center AUC stores the IMSI and authentication key Ki corresponding to the IMSI and Ki stored in the subscriber's SIM card. The AUC thus generates a random number RAND and executes a first algorithm responsive to the values of RAND and Ki to form a signed response (SRES) value and executes a second algorithm responsive to the values of RAND and Ki to form a ciphering Key (Kc). The network transmits to the mobile station the value of RAND generated by the AUC. The mobile station uses the received value of RAND and the value of Ki stored at the SIM card to calculate SRES through the first algorithm and transmits a signal indicative of the calculated SRES to the network. The network compares the SRES previously calculated at the AUC with the value provided by the mobile station. If the mobile station-calculated value of the SRES corresponds with the value of the SRES calculated at the AUC, the mobile station is authenticated and can use the received value of RAND and the value of Ki stored at the SIM card to calculate the ciphering key Kc through the second algorithm. By using the calculated Kc, the mobile station can start a ciphered communication with the circuit switched core network.

As disclosed by the above mentioned US 2001/0017856, the current communication protocol used in the Internet is called IPv4 (Internet Protocol version 4). In order for a node to be functionally connected to the Internet, it requires an IP address. The IP addresses used in IPv4 are 32 bits addresses.

Another Internet Protocol, called IPv6 (Internet Protocol version 6), has been proposed in the art to increase the number of available IP addresses to communicate in the Internet. This protocol has 128 bits addresses, thereby providing a much larger number of addresses than IPv4. An IPv6 address typically consists of a 64-bits network prefix (or subnet prefix) followed by a 64-bits interface identifier.

Two types of address auto-configuration are supported in IPv6: stateless and stateful.

In stateless address auto-configuration, a unique interface identifier is created or selected for a node, either as a random 64-bits number or as a function of some static parameter like the hardware address of the interface. The node then carries out a neighbor discovery procedure referred to as "duplicate detection". This is to ensure that no other node in the same subnet is using the same 64-bits interface identifier. The first step in duplicate detection is to send a multicast packet, limited to the subnet, to a multicast destination address, derived as a function of the interface identifier. The address is multicast to see if it elicits a response. If there is another node having that interface identifier, then it will respond. In this case another interface identifier is chosen and the procedure is repeated until a unique interface identifier is unique to that subnet. At that point, no node having a duplicate interface identifier will respond and the node can obtain a subnet prefix to create a full IPv6 address. Subnet prefixes are announced by routers as part of router advertisements or in response to router solicitations.

In stateful auto-configuration, the node requests its address from a DHCP (dynamic host configuration protocol) server. Since the DHCP server keeps a record of assigned addresses, it is able to assign unique addresses. Therefore, duplicate detection is not strictly necessary although it may be present.

The above mentioned US 2001/0017856 document discloses the allocation of IPv6 addresses in a GPRS system. This document discloses that the mobile station either derives a PDP address (interface identifier) from statically generated information or generates it randomly. As examples of statically generated information it discloses a combination of the NSAPI relating to a PDP context and a unique identifier of the mobile station, such as the international mobile subscriber identity (IMSI), the mobile station integrated services digital network (MSISDN) number or the international mobile station equipment identity (IMEI). This document states that if the interface identifier is chosen deterministically from static information that is already known to both the mobile station and the GGSN, then it is not necessary to transfer. this information during the address acquisition phase. However, since the source of IPv6 address used by a mobile station may be visible to all of its correspondents and all routers en route, this may result in a loss of privacy. Therefore, randomly interface identifiers are preferred. The disclosed method for randomly choosing the interface identifier of the IPv6 address is the following. A mobile station generates a link identifier and sends it to a GGSN over a wireless link in a PDP (packet data protocol) context request together with a request to check if the link identifier is unique; the GGSN receives the PDP context request and checks if the link identifier is unique; the GGSN responds with a PDP context request response including either the unique link identifier confirmed as being unique or a different unique link identifier; the GGSN sends a router advertisement to the mobile station comprising a network prefix; the mobile station combines the interface identifier, extracted from the link identifier, and the network prefix to generate the IP network address. The communication between the mobile station and the GGSN are performed through a SGSN. Since the GGSN is involved in all address assignments, the GGSN ensures that there are no duplicates.

US 2003/0081578 discloses a method for an IP address allocation by an external packet data network (PDN) to a mobile station. According to this method, a mobile station sends a PDP context activation request to a GGSN through a SGSN; acting on behalf of the mobile station, the GGSN solicits the address of a DHCP server within the PDN; the PDN provides the GGSN with the address of the DHCP server to be used by GGSN; the GGSN requests an IPv6 address to the DHCP server; the PDN responds with a IPv6 address assigned to the mobile station; the GGSN performs a duplicate address detection (DAD) procedure to validate the uniqueness of the IPv6 address; when GGSN determines the address to be unique it transmits the interface identifier portion of the IPv6 address to the mobile station through SGSN; then the GGSN transmits a router advertisement message to the mobile station through the SGSN wherein the router advertisement message includes the network prefix obtained from the IPv6 address assigned to the mobile station by the PDN; the mobile station creates the IPv6 assigned thereto by combining the interface identifier and the network prefix in a stateless configuration process without the need for duplicate address detection since the GGSN has previously determined the uniqueness of the address.

The Applicant notes that the above methods disclosed by US 2001/0017856 and US 2003/0081578 require the execution of several steps and several exchanges of data between the mobile station, the GGSN and the PDN. This increases the time required for a mobile station to have an IP address assigned thereto and, thus, to be connected to a packet data network. Moreover, the IP address is assigned to the mobile station only under an explicit request from the mobile station. Therefore, the mobile station is not-reachable from the PDN (that is, it is not able to receive packet data from the PDN) until it sends a PDP context activation request to the GGSN and gets, according to the disclosed methods, the IP address assigned thereto by the network.

SUMMARY OF THE INVENTION

The Applicant faced the technical problem of providing a network address generation which is secure in terms of user privacy and fraud issues, simplifies the operations to be performed by the user equipment and the communication network, speeds up the time required for the user equipment to be connected to a data network and provides the user equipment with the capability of being always reachable by the data network, for example as soon as it is switched-on and it gets access to the communication network.

In a first aspect, the present invention relates to a communication network comprising at least one user equipment comprising a storing unit for storing a shared secret key and a processing unit adapted to generate a network address for the user equipment, wherein at least one portion of the network address is generated based upon at least said shared secret key; and a network equipment adapted to store said shared secret key and to generate said network address, wherein said at least one portion of the network address is generated based upon at least said shared secret key.

In the present description and claims, the term

"shared key", with reference to two parties, is used to indicate a key which is at disposal of both parties;

"secret key", with reference to two parties, is used to indicate a key (e.g., a string of text or an alphanumeric string) which is kept secret, locally used and never exchanged between the two parties. The secret key is typically used by both parties for authentication and/or encryption-decryption purposes;

"dynamic key" is used to indicate a variable key, i.e. a key which may assume different values at different times;

"dynamic calculation" is used to indicate a computation which at different executions may give different results;

"challenge procedure" is used to indicate a procedure executed between two parties sharing a same key wherein at least one party challenges the other party to reply to a predetermined request, the other party being able to correctly reply only if in possession of the shared key. A typical example in the art of a challenge procedure is the authentication procedure mentioned above, performed for verifying the identity of a user equipment prior to authorize it to have access to a communication network (e.g., a GSM or UMTS network);

"network equipment" is used to indicate at least one network apparatus;

"connection", with reference to two entities, is used to indicate that the two entities can communicate with each other directly or through other entities.

In the communication network of the invention, the use of a key shared between the user equipment and the network for calculating the network address allows the network address generation procedure to be simplified with respect to the above mentioned prior art procedures in that it remarkably reduces the number of operations to be performed by the user equipment and the network and the number of information exchanges between them. This allows the network address generation procedure and the connection set up time to the data network to be speeded up.

The use of a shared key also allows the user equipment —as soon as it is switched-on and in possession of such shared key— to auto-generate its network address, without sending any explicit request to the network. This provides the user equipment with the capability of being always reachable by a data network.

Moreover, the use of a secret key—which, according to the definition given in the present description, is kept secret (e.g., for authentication and/or encryption-decryption purposes) and never exchanged between the two parties—makes the network address generation procedure secure in terms of user privacy and fraud issues.

Typically, the network equipment is adapted to associate to an identifier of said at least one user equipment the generated network address so as to enable the user equipment to make use of network connectivity services.

Typically, the user equipment and the network equipment are both adapted to store a same first algorithm and to generate said at least one portion of the network address by executing said first algorithm on the shared secret key.

According to a preferred embodiment of the invention, the shared secret key is a dynamic key. The use of a variable shared secret key further improves the communication network in terms of user privacy, security and fraud issues.

Preferably, the network equipment and the processing unit of the at least one user equipment are both adapted to dynamically calculate said dynamic shared secret key and to generate said at least one portion of the network address based upon said dynamic shared secret key.

According to a preferred embodiment of the invention, one of said at least one user equipment and said network equipment is adapted to communicate a random value to the other one, and both are adapted to calculate the dynamic shared secret key based upon said random value. Typically, the network equipment is adapted to communicate the random value to the user equipment.

Advantageously, the user equipment and the network equipment are adapted to store a same second algorithm and to calculate the dynamic shared secret key by executing said second algorithm on the random value.

Advantageously, the user equipment and the network equipment are also both adapted to store a static shared key and to calculate the dynamic shared secret key based upon both the random value and the static shared key. Typically, the static shared key is associated with a user equipment identifier and/or with a user identifier. Preferably, the dynamic shared secret key is calculated by executing said second algorithm on both the random value and the static shared key.

According to this preferred embodiment, the network address generation is performed through a single exchange of information (the random value) between the network equipment and the user equipment and the execution of two operations (execution of the second algorithm on said random value and, advantageously, also on said static shared key for generating the dynamic shared secret key, and execution of the first algorithm on the generated dynamic shared secret key for calculating said at least one portion of the network address) at both the user equipment and network equipment side.

Advantageously, the user equipment and the network equipment are adapted to dynamically calculate the dynamic shared secret key based on a challenge procedure.

Advantageously, the network equipment is adapted to implement an authentication procedure for verifying the identity of the user equipment in order to authorize it to have access to the communication network.

Advantageously, the authentication procedure is a challenge authentication procedure.

Advantageously, in the authentication procedure, the network equipment and the user equipment are adapted to dynamically generate a ciphering key.

Typically, the network equipment comprises an authentication center.

Advantageously, in said authentication procedure the authentication center is adapted to generate an authentication random value (which is the challenge), to generate a response value to said challenge based upon the generated authentication random value, to generate said ciphering key based upon the generated authentication random value and to send the generated authentication random value to the user equipment. Advantageously, the authentication center is adapted to generate the response value and the ciphering key also based upon a static shared authentication key. Typically, the static shared authentication key is associated with a user equipment identifier or with a user identifier.

Advantageously, in said authentication procedure the user equipment is adapted to receive said authentication random value (the challenge) from the authentication center and to calculate the response value to the challenge and the ciphering key based upon said random value. Advantageously, the user equipment is adapted to store the same static shared authentication key stored in the network equipment and to generate the response value and the ciphering key also based upon said static shared authentication key.

Typically, in said authentication procedure, the user equipment is adapted to transmit the generated response value to the network equipment. Typically, in said authentication procedure, the network equipment is adapted to compare the response value generated therein with the response value received by the user equipment and to send to the user equipment the result of said comparison. If the result is positive (that is, if the response values generated by the user equipment and the network equipment matched), the user equipment is successfully authenticated and can start a ciphered communication with the network equipment by using the ciphering key.

According to a preferred embodiment of the invention, the shared secret key used at the user equipment and network equipment for generating said at least one portion of the network address is the ciphering key calculated in the authentication procedure.

On this purpose the Applicant notes that an authentication procedure is typically performed in existing communication networks prior to providing a user equipment with access to the communication network in order to ensure that the user/user equipment is authorized to use the network communication services.

Therefore, according to this embodiment of the invention, the network address generation procedure—by exploiting a dynamic shared secret key (the ciphering key) which is already at disposal of both the user equipment and the network, after a successful authentication procedure—is performed without requiring any further specific exchange of information between the user equipment and the network and by simply performing a single computation operation (network address calculation based upon the ciphering key). This allows the network address generation procedure to be extremely simplified and the time required for the user equipment to be connected to the data network to be remarkably reduced.

Moreover, linking the network address generation to the authentication procedure guarantees that only authenticated user equipment are provided with an network address and, thus, with access to the data network. Furthermore, as a new ciphering key value is dynamically generated any time the user equipment is—for any reason—re-authenticated, a new user equipment network address is re-calculated at any re-authentication procedure. This minimizes the risk—of security threats to the user and/or to the network caused by long-term assigned network addresses (e.g., the risk of network address spoofing).

Moreover, linking the network address generation to the authentication procedure enables the network to force the user equipment to get a new network address, by subjecting it to a re-authentication procedure, whenever required (e.g., in the event of a fraud attempt to the detriment of the network).

In the preferred embodiment of the invention wherein the network address generation procedure is linked to the authentication procedure, the random value used at the user equipment and network equipment for generating the dynamic shared secret key is advantageously the authentication random value generated in the authentication procedure. Moreover, the static shared key used at the user equipment and network equipment for generating the dynamic shared secret key is advantageously the static shared authentication key used in the authentication procedure.

Typically, the network equipment comprises a data network for providing said at least one user equipment with network connectivity services through the determined network address.

Typically, the data network is adapted to be connected to an external data network.

Typically, the network equipment comprises a gateway, the data network providing the at least one user equipment with network connectivity services through the gateway.

The gateway is advantageously connected to the authentication center.

Advantageously, the gateway is adapted to obtain the ciphering key generated by the authentication center and to calculate the network address based upon the received ciphering key. According to a variant, the network equipment is adapted to calculate the network address based upon the ciphering key generated by the authentication procedure and to send the calculated network address to the gateway.

Advantageously, the network address is an IP address. For example, it may be an IPv4 address. Preferably, it is an IPv6 address.

Typically, the network address comprises a network prefix portion and an interface identifier portion. For example, it comprises a 64 bits network prefix portion and a 64 bits interface identifier portion.

Advantageously, the user equipment and the network equipment are both adapted to generate the network address by combining the interface identifier portion and the network prefix portion.

Typically, the network prefix portion is linked to the position of the user equipment in the communication network. Typically, the network prefix portion is generated at the network equipment. Typically, the network prefix portion is transmitted to the user equipment by the network equipment, for example as part of router advertisements or in response to suitable router solicitations. Typically, the network prefix portion is transmitted to the user equipment by the gateway or by a router associated with the gateway.

Advantageously, the interface identifier portion of the network address is the at least one portion of the network address generated based upon the shared secret key.

According to a preferred embodiment, the at least one portion of the network address is calculated also based upon at least one parameter linked, for example, to the subscriber identity and/or to the user equipment identity. This is advantageous in that it help avoiding that two different user equipments, roaming in the same area and having associated the same network prefix, could be assigned the same network address.

According to a preferred embodiment of the invention, the user equipment is a mobile phone. In this case, the network equipment is advantageously adapted to radio communicate with the mobile phone.

The user equipment may also be, for example, a personal digital assistant, a computer laptop, a pager or other similar device.

In a second aspect, the present invention relates to a method for generating a network address in a communication network comprising at least one user equipment and a network equipment, the method comprising
a) providing a same shared secret key both at the user equipment and at the network equipment;
b) generating at least a portion of the network address at the user equipment and at the network equipment based upon at least said shared secret key.

Advantageously, b) is performed by executing at the user equipment and at the network equipment a same first algorithm on the shared secret key.

According to a preferred embodiment of the invention, the shared secret key is a dynamic key.

Advantageously, the method comprises c) dynamically calculating the dynamic shared secret key at the user equipment and at the network equipment.

According to a preferred embodiment of the invention, c) comprises calculating the dynamic shared secret key based upon a random value. Advantageously, in c) said random value is communicated by one of said at least one user equipment and said network equipment to the other one. Typically, said random value is communicated from the network equipment to the user equipment.

Advantageously, c) is performed by executing at the user equipment and the network equipment a same second algorithm on the random value.

Advantageously, in c) the dynamic shared secret key is calculated at the user equipment and at the network equipment also taking into account a same static shared key. Advantageously, the second algorithm is executed on both the random value and the static shared key.

Advantageously, the method also comprises d) implementing an authentication procedure for verifying the identity of the user equipment in order to authorize it to have access to the communication network.

Advantageously, d) comprises dynamically generating a ciphering key at the network equipment and the user equipment.

According to a preferred embodiment of the invention, the shared secret key used in b) at the user equipment and network equipment for generating said at least one portion of the network address is the ciphering key generated in d).

Advantageously, the method further comprises e) providing said at least one user equipment with network connectivity services through the generated network address. Typically, the network address is an IP address.

The network address typically comprises a network prefix portion and an interface identifier portion.

The network prefix portion is typically generated at the network equipment.

Typically, the method of the invention further comprises transmitting said network prefix portion to the user equipment.

Advantageously, the network address is generated by calculating the interface identifier portion based upon at least the shared secret key and by combining the calculated interface identifier portion and the network prefix portion.

In a third aspect, the present invention relates to an equipment adapted to store a secret key shared with a further equipment in a communication network, and to generate a network address to be used in the communication network, wherein at least one portion of the network address is generated based upon at least said shared secret key.

According to an embodiment, the equipment comprises a mobile phone. According to this embodiment, the further equipment advantageously comprises an authentication center. Typically, the further equipment also comprises a gateway.

According to another embodiment, the equipment comprises an authentication center. Typically, the equipment also comprises a gateway. According to this embodiment, the further equipment advantageously comprises a mobile phone.

As to the structural and functional features of the equipment and further equipment reference is made to what already disclosed above with reference to the user equipment and network equipment.

BRIEF DESCRIPTION OF THE DRAWINGS

The features and advantages of the present invention will be made apparent by the following detailed description of some exemplary embodiments thereof, provided merely by way of non-limitative examples, description that will be conducted by making reference to the attached drawings, wherein.

DETAILED DESCRIPTION OF THE INVENTION

Figure 1:
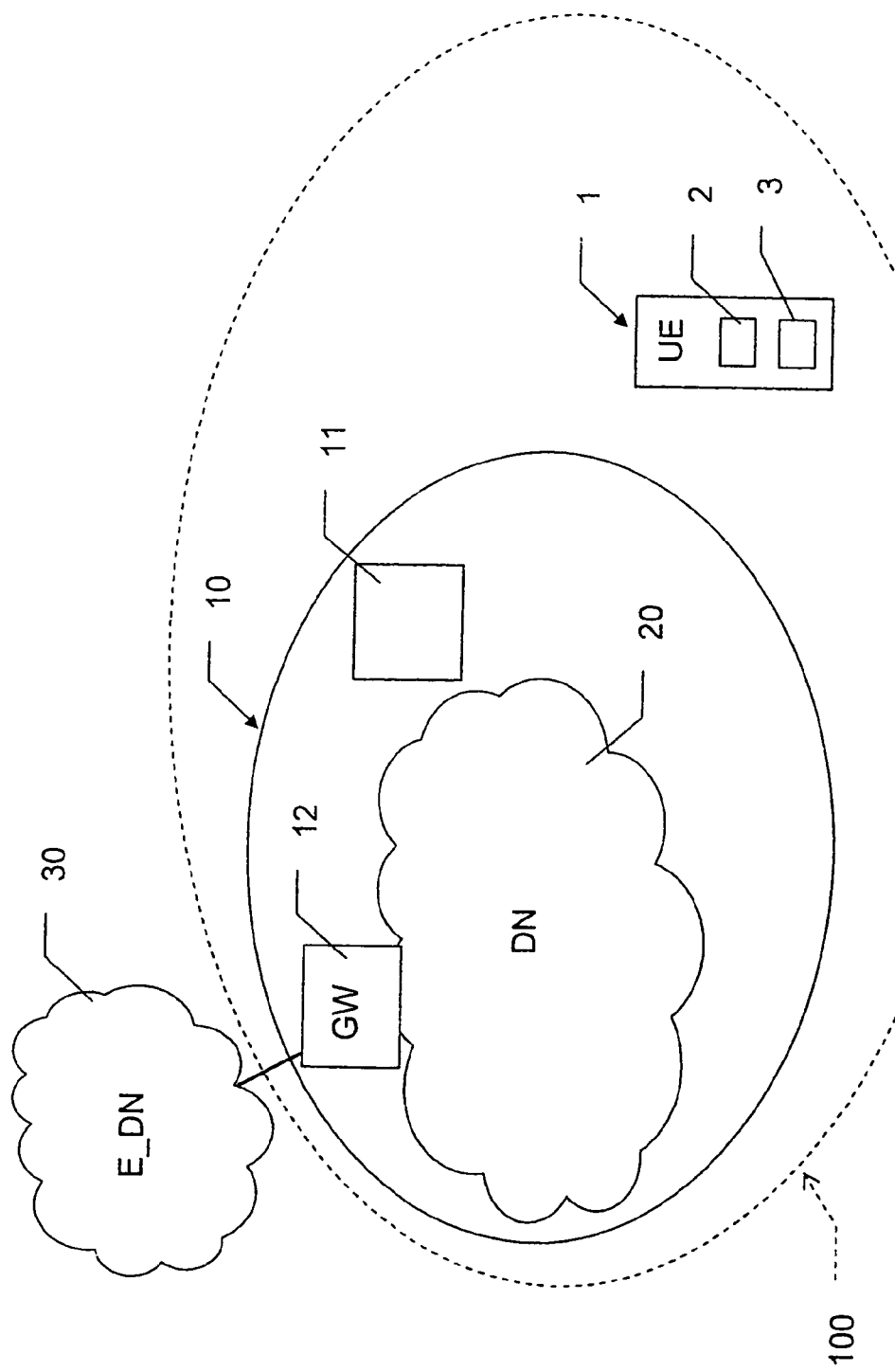
FIG. 1 schematically shows a communication network according to the invention.

FIG. 1 shows an exemplary communication network 100 according to the invention comprising a user equipment (UE) 1 and a network equipment 10.

For the sake of simplicity, in the figures one user equipment is shown and the invention is disclosed with reference to one user equipment only, even if it will be clear that the description applies to network address generation of a plurality of user equipments as well.

The network equipment 10 comprises a gateway (GW) 12, a data network (DN) 20 and an authentication sub-system 11.

The user equipment 1 comprises a storing unit 2 and a processing unit 3.

In the embodiment shown, the data network (DN) 20 is connected to an external data network (E_DN) 30 (e.g., the Internet) through the gateway 12.

The user equipment 1 and the network equipment 10 are adapted to generate a network address (in the disclosed example an IP address) for the user equipment 1 so as to allow the user equipment 1 to make use of network connectivity services (e.g., e-mail, web-browsing, file transfer, mobile TV, packet based multimedia sessions) offered by the data network 20 and/or the external data network 30.

The data network (DN) 20 provides the user equipment 1 with network connectivity services through the gateway 12. For simplicity, in the remainder of the description reference will be made to IP connectivity services as a typical example of network connectivity services.

According to the invention, the IP address is generated based upon a secret key shared by the user equipment 1 and the network equipment 10.

The user equipment 1 and network equipment 10 are both adapted to store the shared secret key and a shared first algorithm f1, and to determine the IP address by executing said algorithm f1 on said shared secret key.

According to the embodiment shown, the authentication sub-system 11 is adapted to implement a challenge authentication procedure for verifying the identity of the user equipment 1 before authorizing it to have access to the communication network 100.

In a preferred embodiment of the challenge authentication procedure, both the user equipment 1 and the authentication sub-system 11 are adapted to store a parameter associated with the user equipment identity or with the user identity (e.g., the International Mobile Subscriber Identity (IMSI) in case of a GSM or UMTS authentication procedure), an authentication key Ki associated with said parameter, a second algorithm f2 and a third algorithm f3.

When the user equipment 1 requires access to the network (for example, when it is switched on), it is adapted to send the parameter associated with the user equipment identity or with the user identity to the authentication sub-system 11 in order to start the authentication procedure.

The authentication sub-system 11 is adapted to receive said parameter from the user equipment 1 and to obtain the authentication key Ki stored therein in correspondence with said parameter.

Moreover, the authentication sub-system 11 is adapted to generate an authentication random value RAND (which is the challenge), to execute the second algorithm f2 on the generated authentication random value RAND and the authentication key Ki for calculating a ciphering key Kc (i.e., Kc=f2 (RAND, Ki)), to execute the third algorithm f3 on the generated authentication random value RAND and the authentication key Ki for calculating a response value CHALL RESP to the challenge (i.e., CHALL RESP=f3 (RAND, Ki)), and to transmit the generated authentication random value RAND to the user equipment 1.

The user equipment 1 is adapted to receive said authentication random value RAND (which is the challenge) from the authentication center; to execute said third algorithm f3 on the random value RAND and on the authentication key Ki for calculating the response value CHALL RESP to said challenge and to transmit the generated response value CHALL RESP to the authentication sub-system 11.

The authentication sub-system 11 is adapted to compare the response value previously generated therein with the response value received by the user equipment 1 and to send to the user equipment 1 an acknowledgement of said comparison.

If the received result of said comparison is positive (i.e., the response values generated by the user equipment 1 and the authentication sub-system 11 matched), the user equipment 1 is successfully authenticated and can start a ciphered communication with the network equipment 10 by using the ciphering key Kc.

The user equipment 1 calculates the ciphering key Kc by executing the second algorithm on the received random value RAND and on the authentication key Ki stored in its storing unit (2).

According to a preferred embodiment of the invention, the shared secret key used at the user equipment 1 and network equipment 10 to generate the IP address is the ciphering key Kc dynamically generated during the authentication procedure.

Therefore, the user equipment, as soon as a ciphering key Kc is calculated as a result of a successful authentication procedure, can generate its IP address by simply executing the first algorithm f1 on the generated ciphering key.

In particular, the IP address is generated by combining a prefix network portion and an identifier interface portion.

The network prefix portion is typically generated at the network equipment 10 based upon a parameter linked to the position of the user equipment 1 in the communication network 100.

A network prefix portion may be associated with each gateway (e.g. gateway 12 of FIG. 1) of the communication network 100.

The gateway 12 (or a router associated therewith, not shown) typically broadcasts the associated network prefix portion to the user equipment 1 as part of router advertisements or in response to suitable router solicitations. This technique is well known in the art and thus not further disclosed in detail hereinafter.

In its turn, the interface identifier portion is calculated based upon the ciphering key.

According to a preferred embodiment, the interface identifier portion is calculated also taking into account at least one other parameter linked, for example, to the subscriber identity and/or to the user equipment identity (e.g., in GSM or UMTS systems, the International Mobile Subscriber Identity or IMSI, the Temporary Mobile Subscriber Identity or TMSI and/or the IMEI).

At the network equipment 10 side, the most appropriate gateway (e.g. gateway 12 in FIG. 1) that can offer packet routing services to the user equipment 1 is identified according to criteria well known in the art (e.g. based upon location information) and the authentication sub-system 11 calculates the identifier interface portion, generates the IP address by combining the prefix network associated with the identified gateway and the calculated identifier interface portion and transmits the generated IP address to the identified gateway.

According to a variant, the authentication sub-system 11 transmits the calculated ciphering key and the optional additional parameter(s) linked to the subscriber identity and/or to the user equipment identity to the identified gateway. In its turn, the gateway calculates the identifier interface portion based upon the received parameters and generates the IP address by combining the prefix network associated therewith and the calculated identifier interface portion.

According to a further variant, the authentication sub-system 11 transmits the calculated identifier interface portion to the identified gateway which, in turn, generates the IP address by combining the prefix network associated therewith and the received identifier interface portion.

At the user equipment 1, the IP address is generated by combining the interface identifier portion—calculated based upon the ciphering key, said optional parameter(s) linked to the subscriber identity and/or to the user equipment identity—and the network prefix portion received by the gateway.

The IP generation procedure according to the invention can be used in GSM or UMTS mobile communication networks to provide GSM/UMTS mobile user equipments with the capability of making use of IP connectivity services and, in particular, with the capability of using the Internet.

Figure 2:
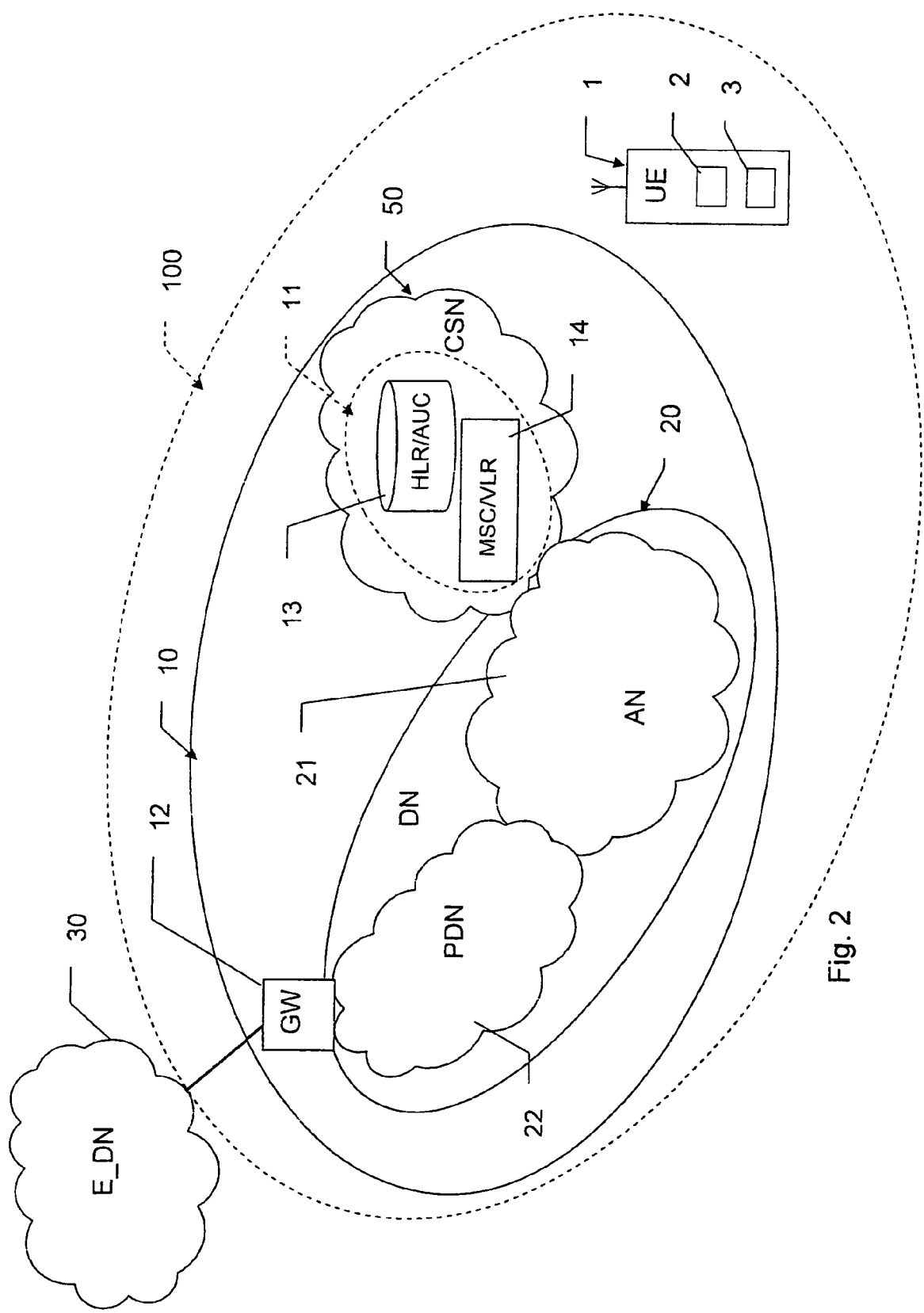
FIG. 2 schematically shows an embodiment of the communication network of FIG. 1.

FIG. 2 shows an embodiment of a GSM/UMTS implementation of the communication network 100 according to the invention.

In particular, the communication network 100 of figure corresponds to that shown in FIG. 1 wherein the user equipment 1 is a mobile station (e.g., GSM/UMTS mobile phone); the data network 20 comprises an access network (AN) 21 and a packet data network (PDN) 22; and the authentication sub-system 11 comprises a home location register-authentication center (HLR/AUC) 13 and a mobile switching center-visitor location register (MSC/VLR) 14 associated with a circuit switched core network (CSN) 50.

It is noted that, even if in a GSM/UMTS circuit switched core network (CSN) a plurality of MSC/VLR and a plurality of mobile user equipments are usually provided, for the sake of simplicity only one mobile switching center, one visitor location register and one mobile user equipment are depicted in FIG. 2.

The access network 21 provides the mobile user equipment 1 with the capability of accessing the circuit switched core network 50 and the packet data network 22. The access network 21 typically comprises a GSM base station system (or BSS) and/or a UMTS terrestrial radio access network (or UTRAN).

The user equipment comprises a storing unit 2 and a processing unit 3, for example implemented by a SIM (subscriber identity module) card.

According to a variant (not shown), the access network 21 may also comprise two different access networks (e.g., selected from a GSM BSS, a UTRAN and a WLAN), one for providing the mobile user equipment 1 with access to the circuit switched core network 50 and the other one for providing the mobile user equipment 1 with access to the packet data network 22.

In a GPRS or UMTS context, the packet data network 22 typically comprises at least one gateway GPRS support node (GGSN) and at least one serving GPRS support node (SGSN), not shown in the figure. In this case, the gateway 12 may correspond to the GGSN.

As GPRS, GSM and UMTS technologies are well known in the art, the above mentioned CSN, MSC, AUC, HLR, VLR, BSS, UTRAN, GGSN, SGSN will not be further described in detail hereinafter.

In the communication network of FIG. 2, the dynamic shared secret key—used at the mobile user equipment 1 and at the network equipment 10 for configuring the IP address for the mobile user equipment 1 according to the invention—advantageously is the ciphering key Kc generated at the end of a successful GSM/UMTS authentication procedure. The GSM/UMTS authentication procedure is wholly similar to that disclosed above with reference to the communication network of FIG. 1 and is well known in the art so that it will not be disclosed further in detail hereinafter.

Figure 3:
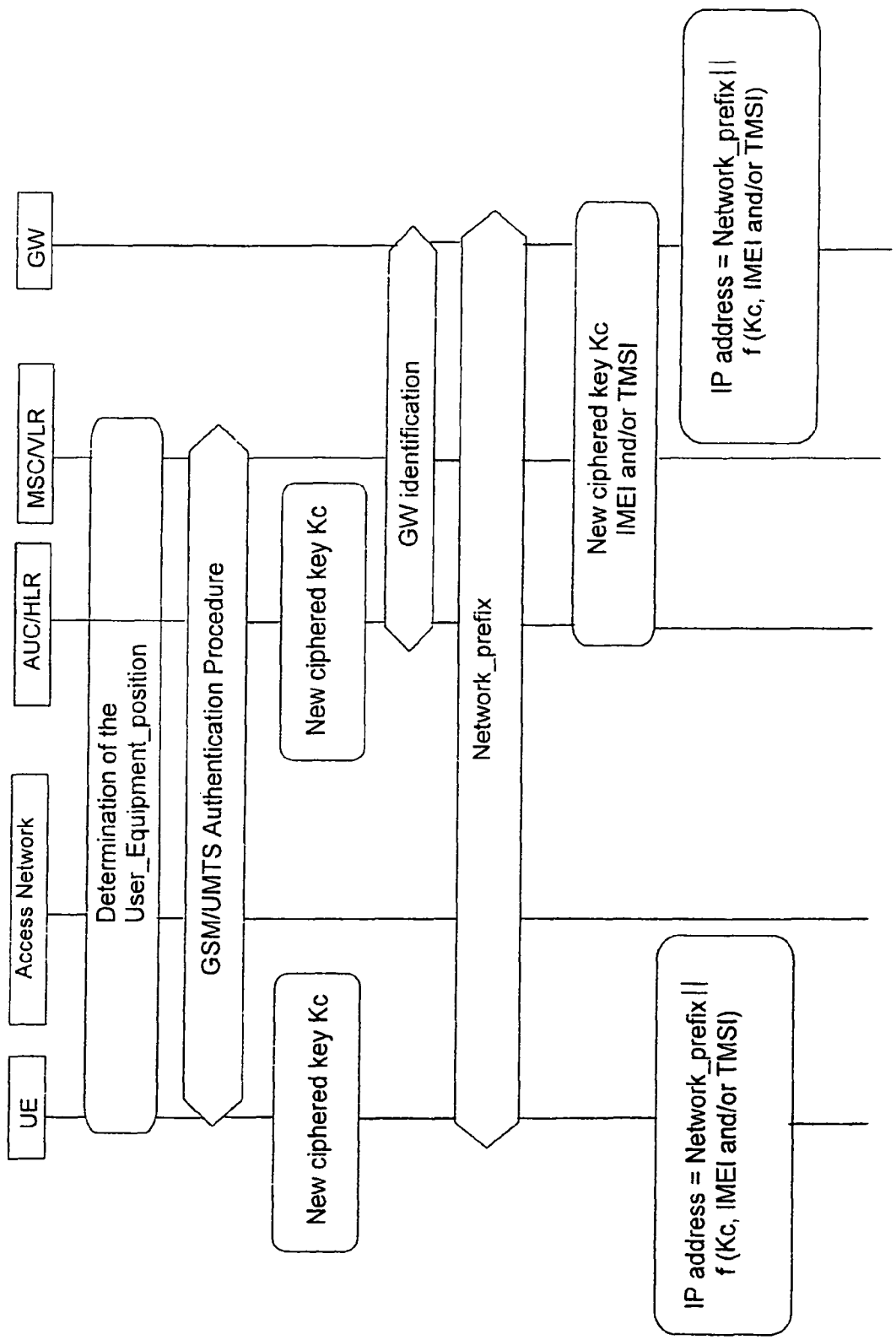
FIG. 3 schematically shows an example of network address generation procedure for the communication network of FIG. 2.

As schematically shown in the example of FIG. 3, once the user switches the mobile user equipment 1 on, the position of the user equipment 1 within the communication network 100 is determined, according to techniques well known in the art.

Then, the identity of the user equipment 1 is verified by the authentication sub-system 11 through the GSM/UMTS authentication procedure and a ciphered key Kc is generated both at the user equipment 1 and at the authentication center 11.

Once the ciphered key Kc has been generated, the IP address for the user equipment 1 can be calculated both at the user equipment 1 and at the network equipment 10 by combining the interface identifier portion, calculated based upon the generated ciphered key Kc, and the network prefix portion broadcasted by the gateway serving the area associated with the user equipment position.

In particular, in the example shown, at the network equipment side, the MSC/VLR 14 retrieves the ciphered key Kc generated and stored in the HLR/AUC 13 for the user equipment 1 and the appropriate gateway GW for offering packet routing services to the user equipment 1 is identified. Then, the identified gateway obtains the parameters necessary to calculate the interface identifier portion of the IP address (that is, the ciphering key Kc and, optionally, other parameters such as, for example, the IMEI and/or the TMSI), calculates the interface identifier portion based upon the received parameters and generates the IP address by combining the calculated interface identifier portion and the network prefix portion associated with it.

According to the IP address generation procedure of the invention, as soon as a user switches a user equipment on and a ciphering key Kc is generated as result of a successful authentication procedure, the user equipment can auto-generate its IP address to have access to the IP services offered by the packet data network 22 and the external data network 30, without the necessity of sending any explicit request of IP address generation to the communication network. Therefore, the time required for the user equipment to be connected to the packet data network is extremely reduced and the user equipment can be always reachable by the packet data network, once switched-on and authenticated.

Moreover, the IP address generation procedure of the preferred embodiment of the invention guarantees that only authenticated user equipments get access to the packet data network.

Furthermore, it is noted that—as a new ciphering key value is dynamically generated any time the user equipment is, for any reason, re-authenticated—a new user equipment IP address is re-calculated at any re-authentication procedure. This minimizes the risk of any security threats to the user and/or to the network. Moreover, linking the IP address generation to the authentication procedure has the advantage of enabling the network to force the user equipment to get a new IP address, by subjecting it to a re-authentication procedure, whenever required (e.g., in the event of a fraud attempt to the detriment of the network).

It is further noted that, as both the user equipment and network equipment are able to locally calculate the ciphering key, they do not need to transmit it to the other entity and they can keep it secret. In particular, once locally generated, the ciphering key is never revealed to unauthorized third parties and when communicated outside, it is never transmitted in the communication network by air. Moreover, the ciphering key is dynamically generated based upon a randomly generated value. These two features (secrecy and dynamism) contribute towards remarkably increasing the security of the IP address generation procedure in terms of user privacy and fraud issues.

Additionally, according to the invention, the IP generation procedure is extremely simplified. Indeed, the IP address is generated by simply performing a single computation based upon the ciphered key generated during the authentication procedure and without requiring any further exchange of information between the user equipment 1 and the network equipment 10, besides those already provided in the authentication procedure.

By way of example, in the case of IPv6 address comprising a 64 bits network prefix portion and a 64 bits interface identifier portion, the IP address can be generated through the following algorithm:

$$IPv6\_address=Network\_Prefix\|(TMSI)\|G(Kc)$$

wherein "Network_Prefix" is the 64 bits network prefix portion, TMSI is a 32 bits string corresponding to the Temporary Mobile Subscriber Identity, G(Kc) is 32 bits string obtained by executing a hash function of the ciphering key Kc and the symbol∥ is used to indicate the concatenation of the three strings of bits.

In particular, G(Kc) generates a 128 bits hash function of Kc and then selects the first 32 bits thereof. It is noted that hash functions act so that with a given input, they always produce the same output. An example of hash function which can be used is the MD5 (message digest number five) algorithm well known in the art.

It is noted that in a GSM or UMTS communication system, the TMSI is typically allocated to the user equipment once the ciphering key Kc is generated, and it is sent to the user equipment in a ciphered mode.

This example of IP address generation is advantageous because, by using a globally unique identifier of the subscriber (the TMSI), it helps avoiding that two different user equipments, roaming in the same location area having associated the same network prefix portion, could be assigned the same IP address.

According to another example, the IP address can be generated through the following algorithm:

$$IPv6\_address=Net\_Prefix\|H(Kc).$$

wherein "Network_Prefix" is the 64 bits network prefix portion, H(Kc) is a 64 bits string obtained by executing a hash function of the ciphering key Kc and the symbol ∥ is used to indicate the concatenation of the two strings of bits.

In particular, H(Kc) generates a 128 bits hash function of Kc and then selects the first 64 bits thereof.

In this latter example, wherein a globally unique identifier of the user equipment and/or subscriber is not used, any duplication of IP address within a certain location area, could be for example resolved by:

forcing a re-authentication procedure, thereby generating a new ciphering key Kc for calculating a new IP address; or generating a new IP address based on a different "processing" of the same ciphering key (e.g. by selecting a different subfield of bits of the 128 bits hash function of Kc generated by H(Kc), or by using a unique identifier of the user equipment or of the subscriber as additional input parameter).

In either case, the newly applied algorithm shall run exactly in the same way both at user equipment and network equipment side, so as to generate the same (new) IP address.

It is noted that similar examples can be provided also for IPv4 addresses.

It is also noted that even if in the disclosed preferred embodiment of the invention the network address is determined based upon a dynamic shared secret key, dynamically generated through an authentication challenge procedure, the shared secret key could also be generated through another type of procedure. Moreover, it is not necessary for the shared secret key to be dynamically generated. Indeed, it could also be a static secret key at disposal of both the user equipment and the network equipment.

The invention claimed is:

1. A method for generating a network address in a communication network comprising at least one user equipment and a network equipment, comprising:
   a) providing a same shared secret key both at said at least one user equipment and at the network equipment; and
   b) generating at least a portion of the network address at said at least one user equipment and at the network equipment based upon at least said shared secret key.

2. The method according to claim 1, wherein b) is performed by executing at said at least one user equipment and at the network equipment a same first algorithm on the shared secret key.

3. The method according to claim 1, wherein the shared secret key is a dynamic key.

4. The method according to claim 3, further comprising c) dynamically calculating the dynamic shared secret key at said at least one user equipment and at the network equipment.

5. The method according to claim 4, wherein c) comprises calculating the dynamic shared secret key based upon a random value.

6. The method according to claim 5, wherein, in c) said random value is communicated by one of said at least one user equipment and said network equipment to the other one.

7. The method according to claim 5, wherein c) is performed by executing at said at least one user equipment and the network equipment a same second algorithm on the random value.

8. The method according to claim 5, wherein in c) the dynamic shared secret key is calculated at said at least one user equipment and at the network equipment also taking into account a same static shared key.

9. The method according to claim 1, further comprising d) implementing an authentication procedure for verifying the identity of said at least one user equipment in order to authorize said at least one user equipment to have access to the communication network.

10. The method according to claim 9, wherein d) comprises dynamically generating a ciphering key at the network equipment and at said at least one user equipment.

11. The method according to claim 10, wherein the shared secret key used in b) is the ciphering key generated in d).

12. A communication network comprising:
  at least one user equipment comprising a storing unit for storing a shared secret key and a processing unit adapted to generate a network address for the user equipment, wherein at least one portion of the network address is generated based upon at least said shared secret key; and
  a network equipment adapted to store said shared secret key and to generate said network address, wherein said at least one portion of the network address is generated based upon at least said shared secret key.

13. The communication network according to claim 12, wherein the shared secret key is a dynamic key.

14. The communication network according to claim 13, wherein the processing unit of the at least one user equipment and the network equipment are both adapted to dynamically calculate said dynamic shared secret key and to generate said at least one portion of the network address based upon at least said dynamic shared secret key.

15. The communication network according to claim 14, wherein said at least one user equipment and the network equipment are adapted to dynamically calculate the dynamic shared secret key based on a challenge procedure.

16. The communication network according to claim 12, wherein the network equipment is adapted to implement an authentication procedure for verifying the identity of said at least one user equipment in order to authorize said at least one user equipment to have access to the communication network.

17. The communication network according to claim 16, wherein the authentication procedure is a challenge authentication procedure.

18. The communication network according to claim 16, wherein in the authentication procedure the network equipment and said at least one user equipment are adapted to dynamically generate a ciphering key.

19. The communication network according to claim 18, wherein the shared secret key used at said at least one user equipment and network equipment for generating said at least one portion of the network address is said ciphering key.

20. The communication network according to claim 12, wherein said at least one portion of the network address is calculated also based upon at least one parameter associated with the subscriber identity and/or with the user equipment identity.

21. The communication network according to claim 12, wherein said at least one user equipment is a mobile phone.

* * * * *